United States Patent
Son (10) Patent No.: US 11,003,877 B2
(45) Date of Patent: May 11, 2021

(54) METHODS AND SYSTEMS FOR RECOGNIZING AND READING A CODED IDENTIFICATION TAG FROM VIDEO IMAGERY

(71) Applicant: Vaas International Holdings, Inc., Fort Worth, TX (US)

(72) Inventor: Dihn Tien Son, Tphcm (VN)

(73) Assignee: VAAS INTERNATIONAL HOLDINGS, INC., Fort Worth, TX (US)

( * ) Notice: Subject to any disclaimer, the term of this patent is extended or adjusted under 35 U.S.C. 154(b) by 0 days.

(21) Appl. No.: 16/504,137

(22) Filed: Jul. 5, 2019

(65) Prior Publication Data

US 2021/0004552 A1    Jan. 7, 2021

(51) Int. Cl.
| | | |
|---|---|---|
| *G06K 7/08* | (2006.01) | |
| *G06K 7/14* | (2006.01) | |
| *G06T 7/70* | (2017.01) | |
| *G06K 9/00* | (2006.01) | |
| *H04N 7/18* | (2006.01) | |

(52) U.S. Cl.
CPC ....... *G06K 7/1417* (2013.01); *G06K 9/00228* (2013.01); *G06K 9/00268* (2013.01); *G06K 9/00288* (2013.01); *G06T 7/70* (2017.01); *H04N 7/183* (2013.01); *G06T 2207/10016* (2013.01); *G06T 2207/30232* (2013.01)

(58) Field of Classification Search
CPC ............. G06K 7/00; G06K 7/08; G06K 7/081
USPC ......................... 235/451, 454, 385
See application file for complete search history.

(56) References Cited

U.S. PATENT DOCUMENTS

| | | | | |
|---|---|---|---|---|
| 2007/0122003 A1* | 5/2007 | Dobkin | ............ | G08B 13/19645 382/115 |
| 2007/0164845 A1* | 7/2007 | Ivins | ................ | G08B 13/19676 340/3.9 |

(Continued)

OTHER PUBLICATIONS

Ankit Mohan et al: "Bokode", SIGGRAPH 2009: Conference Aug. 3-7, 2009, Exhibition Aug. 4-6, 2009, Ernest N. Morial Convention Center, New Orleans, Louisiana, ACM, New York, NY, Jul. 27, 2009 (Jul. 27, 2009), pp. 1-8, XP058314650, all pages.

(Continued)

*Primary Examiner* — Daniel St Cyr (57) ABSTRACT

Methods and systems for quickly and accurately identifying a coded identification tag imaged by conventional CCTV video monitoring equipment are presented herein. In one aspect, a coded identification tag includes a plurality of dark-colored polygons arranged around a light-colored central background area to maximize contrast between the polygons and the central background area. An array of dark-colored dots is arranged over the light-colored central background area. A light-colored border is located around the plurality of dark-colored polygons. A Coded Identification Tag Monitoring (CITM) system estimates the position and orientation of the coded identification tag with respect to the collected image based on the unique orientation of the coded identification tag with respect to an image frame. In some examples, the CITM system decodes the coded identification tag when the tag occupies less than 10% of the area of the image collected by the video imaging system.

14 Claims, 11 Drawing Sheets

(56) References Cited

U.S. PATENT DOCUMENTS

| | | | |
|---|---|---|---|
| 2008/0144880 A1* | 6/2008 | DeLuca | G06T 7/20 |
| | | | 382/100 |
| 2015/0119685 A1 | 4/2015 | Daon et al. | |
| 2015/0324634 A1* | 11/2015 | Brosens-Kessels | G16H 40/20 |
| | | | 382/103 |
| 2016/0335686 A1* | 11/2016 | AthuluruTlrumala | |
| | | | G06F 3/0482 |
| 2016/0335731 A1* | 11/2016 | Hall | G06Q 10/067 |
| 2018/0197052 A1* | 7/2018 | Yanson | G06K 19/06037 |

OTHER PUBLICATIONS

Xiang Zhang et al: "Visual Marker Detection and Decoding in AR Systems", Proceedings/ International Symposium on Mixed and Augmented Rality: !SMAR 2002 ; Sep. 30-Oct. 1, 2002, Darmstadt, Germany, IEEEE Computer Society, Los Alamitos, Calif. [U .A.], Sep. 30, 2002 (Sep. 30, 2002), p. 97, XP058274979, all pages.

Invitation to Pay Additional Fees with Provisional Opinion Accompanying the Partial Search Results, corresponding patent application No. PCT/US2020/040404 filed Jul. 1, 2020, dated Oct. 1, 2020, all pages.

Ankit Mohan et al: "Bokode",SIGGRAPH 2009 .. Conference 3-7 August 10-14, 2009, Exhibition Aug. 4-6, 2009, Ernest N. Mori AL Convention Center, New Orleans, Louisiana, ACM, New York, NY, Jul. 27, 2009 (Jul. 27, 2009), pp. 1-8, XP058314650, DOI: 10.1145/1576246.1531404.

Xiang Zhang et al: "Visual Marker Detection and Decoding in AR Systems", Proceedings/ International Symposium on Mixed and Augmented Rality : !SMAR 2002 ; Sep. 30-Oct. 1, 2002, Darmstadt, Germany, IEEEE Computer Society, Los Alamitos, Calif. [U.A.], Sep. 30, 2002 (Sep. 30, 2002), p. 97, XP058274979, ISBN: 978-0, all pages.

Pavlidis T et al: "Fundamentals of bar code information theory", Computer, IEEE Computer Society, USA, vol. 23, No. 4, Apr. 1, 1990 (Apr. 1, 1990), pp. 74-86, XP011416321, all pages.

The International Search Report and the Written Opinion corresponding serial No. PCT/US2020/040404 filed: Jul. 1, 2020, dated Nov. 27, 2020 all pages.

* cited by examiner

| IMAGE ID | TAG IMAGE | ROTATED TAG IMAGE | IMAGE OF EXTRACTED FEATURES | BINARY CODE | DECIMAL CODE |
|---|---|---|---|---|---|
| | | | MEMORY 115 | | |
| 0001 | 140A.IMG | 141A.IMG | 142A.IMG | 0 0 0 1<br>0 0 0 1<br>0 0 0 1<br>0 0 1 1 | 4371 |
| 0001 | 140B.IMG | 141B.IMG | 142B.IMG | 1 0 0 1<br>1 0 0 1<br>1 0 1 0<br>1 0 1 1 | 39339 |
| 0001 | 140C.IMG | 141C.IMG | 142C.IMG | 0 1 1 1<br>0 1 1 1<br>1 1 0 1<br>1 1 1 1 | 30687 |
| ⋮ | ⋮ | ⋮ | ⋮ | ⋮ | ⋮ |

FIG. 18

METHODS AND SYSTEMS FOR RECOGNIZING AND READING A CODED IDENTIFICATION TAG FROM VIDEO IMAGERY

TECHNICAL FIELD

The described embodiments relate to coded identification tags and systems and tools employed to establish identity based on the coded identification tags.

BACKGROUND INFORMATION

Automated identification of objects based on identification tags is widespread. A wide variety of tags and associated reading systems have been developed to perform an identification task with high accuracy. Examples include bar code identification tags and systems, magnetic identification tags and systems, etc.). However, these high accuracy identification techniques have some disadvantages. First, these identification systems require specialized tools to detect the code. Second, the detection hardware typically requires interaction with the identification tag at close range (e.g., touch magnetic card on a detector surface). Third, the specialized detection tools add cost to an overall identification system.

Closed circuit television (CCTV) systems are typically employed to monitor the presence and movements of people and objects in publically accessible areas. Modern, networked CCTV units record a stream of digital images and upload the recorded images to memory over a digital network. Although CCTV video imagery is available at relatively low cost, robust, high accuracy identification based on CCTV video imagery is currently limited by commonly available image resolution and practical computational limits.

For example, identification for access control requires very high accuracy of identification. This is particularly the case when access control to sensitive sites is required (e.g., access to military installations, high technology facilities, medical facilities, etc.). In some examples, accuracy of identification should be near perfect (e.g., 99.999%). Currently, this is out of reach of computationally practical facial recognition systems based on CCTV imagery.

Improvements to existing identification systems are desired to facilitate the identification of persons or objects of interest within images collected by conventional CCTV monitoring equipment at normal monitoring distances.

SUMMARY

Methods and systems for quickly and accurately identifying a coded identification tag imaged by conventional CCTV video monitoring equipment are presented herein.

In one aspect, a coded identification tag as described herein includes a plurality of dark-colored polygons arranged around a light-colored central background area to maximize contrast between the polygons and the central background area. An array of dark-colored dots is arranged over the light-colored central background area. The plurality of dark-colored polygons are symmetric about a symmetry axis passing through the geometric center of the coded identification tag. However, the plurality of dark-colored polygons are not symmetric about an asymmetry axis passing through the geometric center of the coded identification tag and perpendicular to the symmetry axis. In addition, the coded identification tag includes a light-colored border around the plurality of dark-colored polygons to enhance contrast between the polygons and the object upon which the coded identification tag is disposed. In some examples, the dark colored polygons and dots are black in color and the light colored background area and border are white in color to maximize contrast.

In a further aspect, a Coded Identification Tag Monitoring (CITM) system distinguishes the coded identification tag from the rest of the objects captured in the collected image by the arrangement of the dark colored polygons surrounding the light-colored central area.

In another further aspect, the asymmetric arrangement of the polygons defines a unique orientation of the coded identification tag with respect to an image frame, and a CITM system estimates the position and orientation of the coded identification tag with respect to the collected image based on the position and orientation of the polygons.

In another further aspect, a CITM system identifies the type of the coded identification tag based on the arrangement of the polygons. Different types of coded identification tags are distinguished from one another by different shape characteristics of the dark colored polygons surrounding the light-colored central area.

In another further aspect, a CITM system determines the coded identification number associated with a coded identification tag from an image when the coded identification tag occupies less than 10% of the area of the image collected by the video imaging system. In some embodiments, the CITM system determines the coded identification number associated with a coded identification tag from an image when the coded identification tag occupies less than 5% of the area of the image collected by the video imaging system. In some embodiments, the CITM system determines the coded identification number associated with a coded identification tag from an image when the coded identification tag occupies less than 3% of the area of the image collected by the video imaging system. In general, a CITM system accurately determines the coded number when a single dot of the coded array of dots on the coded identification tag is imaged onto three pixels, two pixels, or even one pixel.

In a further aspect, a CITM system captures an image including multiple coded identification tags and determines the coded identification number associated with each of the multiple coded identification tags from the same image. In this manner, multiple coded identification tags may be employed to define a much larger range of base-10 numbers. For example, two 20 bit coded identification tags may be concatenated to represent one 40 bit binary number.

In a further aspect, a CITM system is employed in conjunction with a facial recognition system to accurately identify a person from the same sequence of images. Each of the sequence of images includes both the face of a person and a coded identification tag worn by the person. The coded identification tag is read by a CITM system. The decoded identification number is associated with a reference image of a particular person stored in the memory of the CITM system. A facial recognition system is employed to compare the facial features of the face of the unidentified captured by the video imaging device and the facial features of the particular person characterized by the reference image. If the difference between the compared features is below a predetermined threshold, the previously unidentified person is identified as the person associated with the reference image.

In this manner a person is accurately identified using both facial features and a coded identification tag derived from the same collected image.

DETAILED DESCRIPTION

Reference will now be made in detail to background examples and some embodiments of the invention, examples of which are illustrated in the accompanying drawings.

Methods and systems for quickly and accurately identifying a coded identification tag imaged by conventional CCTV video monitoring equipment are presented herein.

Figure 1:
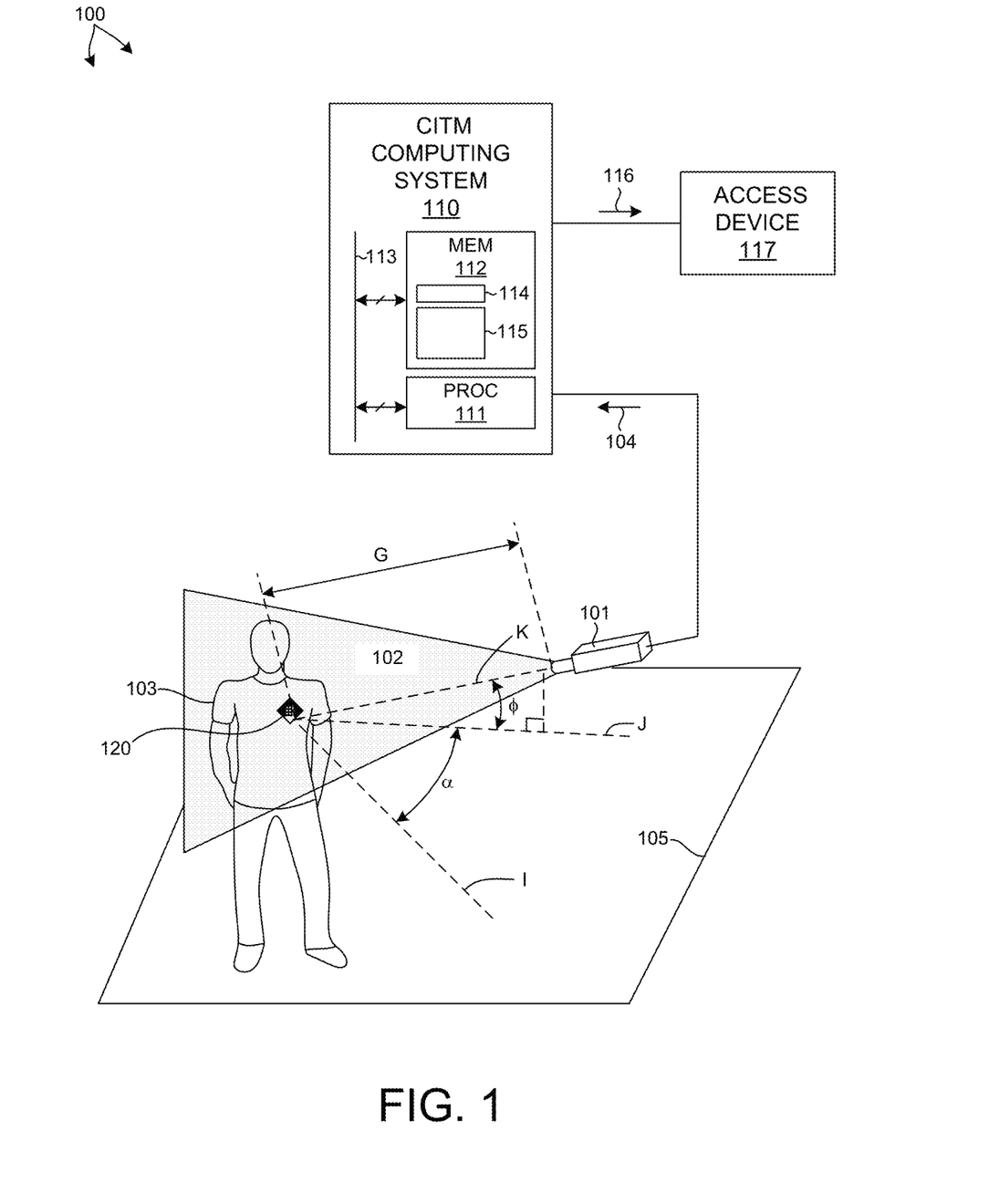
FIG. 1 is a diagram illustrative of a Coded Identification Tag Monitoring (CITM) system 100 that includes a video imaging device 101 (e.g., a closed circuit television (CCTV) monitoring device), a coded identification tag 120, and a CITM computing system 110.

FIG. 1 is a diagram illustrative of a Coded Identification Tag Monitoring (CITM) system 100 that includes a video imaging device 101 (e.g., a closed circuit television (CCTV) monitoring device), a coded identification tag 120, and a CITM computing system 110.

FIG. 1 depicts a human 103 wearing a coded identification tag 120 in the field of view 102 of video imaging device 101. As depicted in FIG. 1, the i-axis is normal to the surface of the coded identification tag 120 and the k-axis lies on the line of sight path between video imaging device 101 and coded identification tag 120. In some embodiments, the distance, G, between video imaging device 101 and coded identification tag 120 is at least one meter. In some embodiments, the distance between video imaging device 101 and coded identification tag 120 is at least two meters. In this manner, video imaging device 101 captures one or more images of coded identification tag 120 useful to decode the coded identification tag without close proximity (e.g., less than 10 centimeters) between the video imaging device 101 and the coded identification tag 120.

Accurate identification is achieved without specialized code detection devices, and without the unidentified person having to interact with the specialized detection hardware at close range (e.g., touch magnetic card on a detector surface). Achieving highly accurate identification without specialized code detection devices also reduces the cost of the identification system.

The i-axis and the j-axis form a plane (the ij plane) parallel to the ground plane 105 upon which the human 103 stands. Furthermore, the j-axis is a projection of the k-axis onto the ij plane in a direction normal to the ij plane. The angle between the i-axis and the j-axis is the azimuth angle, $\alpha$. The angle between the k-axis and the j-axis is the elevation angle, $\phi$. As depicted in FIG. 1, the azimuth angle, the elevation angle, and the distance, G, define the location of the video imaging device with respect to the surface of coded identification tag 120. In one example, the azimuth and elevation angles are zero. In this example, the k-axis lying on the line of sight between video imaging device 101 and the coded identification tag 120 is normal to the surface of the coded identification tag 120. CITM system 100 enables accurate decoding of the coded identification tag at any azimuth and elevation angle between +/−35 degrees. In some embodiments, accurate decoding of the coded identification tag is performed at any azimuth and elevation angle greater than 15 degrees and less than −15 degrees.

As depicted in FIG. 1, video imaging device 101 communicates image signals 104 to CITM computing system 110. Image signals 104 indicate the image information collected by an image sensor of video imaging device 101 including one or more images of the coded identification tag 120. The image sensor includes a two dimensional array of pixels (e.g., charge coupled device (CCD), complementary metal-oxide semiconductor (CMOS) device, etc.). Typical CCTV video equipment employs image sensors having a 1920×1080 pixel array. However, image resolution varies among CCTV video equipment and, in general, is trending toward higher resolutions.

In the embodiment depicted in FIG. 1, CITM computing system 110 identifies the code number on the tag based on image signals 104 and determines if the identified code number matches a code number that is allowed access to a restricted area. If there is a match, CITM computing system 110 communicates a command signal 116 to access device 117 indicating that the person wearing the coded identification tag 120 should be granted access to the restricted area. In response to command signal 116, access device 117 unlocks, or otherwise allows access to the restricted area to human 103. Although FIG. 1 depicts an embodiment employing a coded identification tag imaged by conventional CCTV video monitoring equipment for access control, many other applications are contemplated within the scope of this patent document (e.g., asset tracking, asset identification, monitoring, etc.).

In one aspect, a coded identification tag as described herein includes a plurality of dark-colored polygons arranged around a light-colored central background area to maximize contrast between the polygons and the central background area. An array of dark-colored dots is arranged over the light-colored central background area. The plurality of dark-colored polygons are symmetric about a symmetry axis passing through the geometric center of the coded identification tag. However, the plurality of dark-colored polygons are not symmetric about an asymmetry axis passing through the geometric center of the coded identification tag and perpendicular to the symmetry axis. In addition, the coded identification tag includes a light-colored border around the plurality of dark-colored polygons to enhance contrast between the polygons and the object upon which the coded identification tag is disposed. in some examples, the dark colored polygons and dots are black in color and the light colored background area and border are white in color to maximize contrast.

Figure 2:
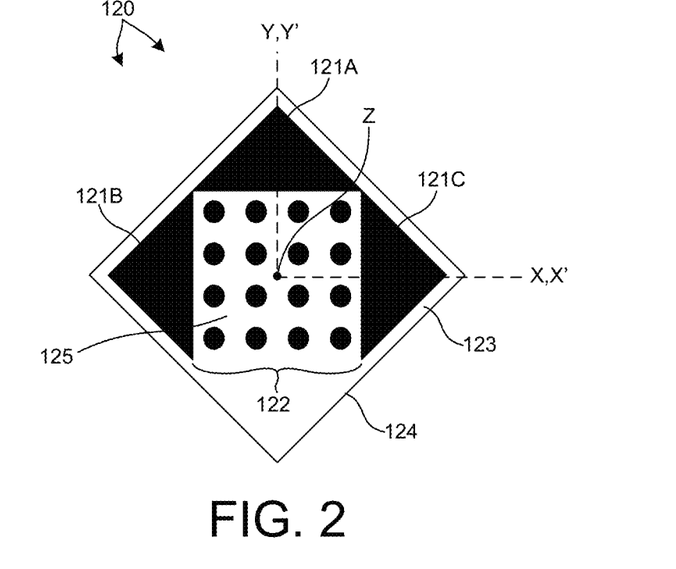
FIG. 2 depicts coded identification tag 120 in one embodiment.

FIG. 2 depicts coded identification tag 120 in one embodiment. The coded identification tag 120 includes three black-colored triangle shapes 121A-C arranged around a white-colored central background area 125. Each of the triangle shapes 121A-C are right triangles arranged such that the hypotenuse of each right triangle forms the border of the central background area 125 on three sides. Triangle shape 121A is oriented 90 degrees with respect to triangle shape 121B, and triangle shape 121C is oriented 90 degrees with respect to triangle shape 121A. Triangle shapes 121B and 121C are oriented 180 degrees with respect to one another. As depicted in FIG. 2, triangle shapes 121A-C are symmetric about symmetry axis, Y', passing through the geometric center of coded identification tag 120. However, triangle shapes 121A-C are asymmetric about asymmetry axis, X', passing through the geometric center of coded identification tag 120 and perpendicular to symmetry axis, Y'.

In one aspect, CITM system 100 distinguishes the coded identification tag from the rest of the objects captured in the collected image by the arrangement of the dark colored polygons surrounding the light-colored central area (e.g., the arrangement of black-colored triangle shapes 121A-C).

In a further aspect, the one-sided asymmetric arrangement of triangle shapes 120A-C defines a unique orientation of the coded identification tag with respect to an image frame. As depicted in FIG. 2, the top of the coded identification tag is defined as the location of the right-angled vertex of triangle shape 121A (i.e., the triangle shape intercepted by the symmetry axis, Y', and the bottom of the coded identification tag is opposite the top of the coded identification tag. In general, the legs of the black-colored triangle shapes 121A-C define three corners of a square. The fourth corner is white colored, which defines the bottom of the coded identification tag. In this embodiment, CITM system 100 estimates the position and orientation of the coded identification tag with respect to the collected image based on the position and orientation of the black-colored triangle shapes 121A-C.

As depicted in FIG. 2, the xy coordinate frame is fixed to an image frame (i.e., the two dimensional grid of pixels that comprise the image). The x-axis defines the horizontal axis of the image frame and the y-axis defines the vertical axis of the image frame. The x'-axis and the y'-axis are defined by the orientation of the triangle shapes 121A-C as described hereinbefore. In this manner, the x'y' coordinate frame is fixed to the coded identification tag. Thus, the orientation of the x'y' coordinate frame with respect to the xy coordinate frame defines the orientation of the coded identification tag with respect to the image frame.

Figure 6:
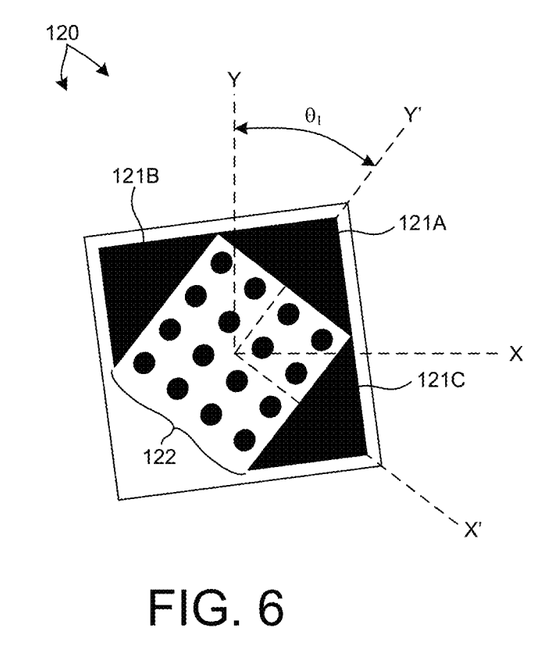
FIG. 6 depicts coded identification tag 120 oriented at an angle, $\theta_1$, with respect to the image frame.
Figure 7:
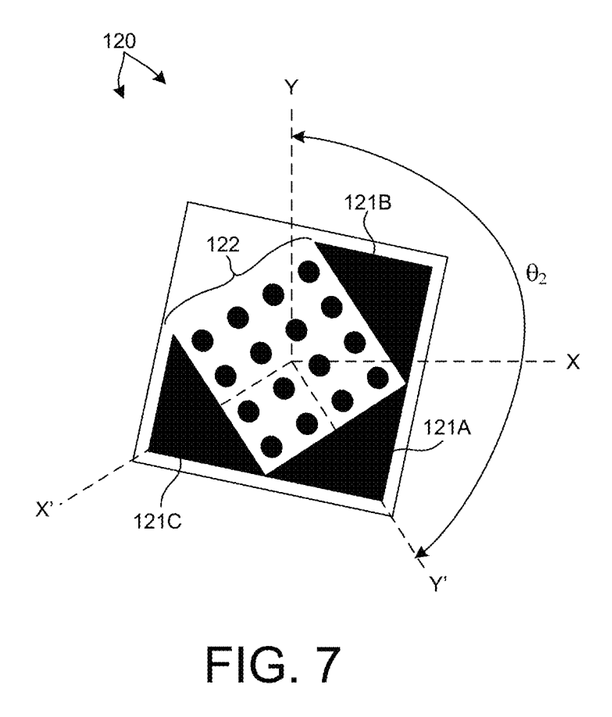
FIG. 7 depicts coded identification tag 120 oriented at an angle, $\theta_2$, with respect to the image frame.

As depicted in FIG. 2, the coded identification tag is aligned with respect to the image frame (i.e., the y' axis and the y axis are aligned and the x' axis and the x axis are aligned). FIG. 6 depicts coded identification tag 120 oriented at an angle, $\theta_1$, with respect to the image frame. FIG. 7 depicts coded identification tag 120 oriented at an angle, $\theta_2$, with respect to the image frame. Read in any orientation relative to image frame. The one-sided asymmetric arrangement of triangle shapes 120A-C defines a unique orientation of the coded identification tag with respect to an image frame. Thus, image recognition is applied to uniquely determine angle, $\theta_1$, from the image of coded identification tag 120 depicted in FIG. 6. Similarly, image recognition is applied to uniquely determine angle, $\theta_2$, from the image of coded identification tag 120 depicted in FIG. 7.

In general, image recognition is applied to uniquely determine any orientation of a coded identification tag as described herein relative to an image frame that includes an image of the coded identification tag.

In a further aspect, the CITM system 100 identifies the type of the coded identification tag based on the arrangement of black-colored triangle shapes 121A-C. Different types of coded identification tags are distinguished from one another by different shape characteristics of the dark colored polygons surrounding the light-colored central area. Furthermore, a filter is selected based on the identified type of coded identification tag. The filter is employed to identify the coded number of the coded identification tag.

In a further aspect, a coded identification tag as described herein includes a white-colored border at the outer perimeter of the coded identification tag to enhance image contrast between the coded identification tag and background noise (e.g., different colored objects upon which the coded identification tag is disposed). This ensures the coded identification tag does not blend into a background that may have similar colors.

FIG. 2 also depicts a white colored border 123 at the outer perimeter of coded identification tag 120. The black line 124 illustrates the maximum extent of the coded identification tag 120 in this particular example.

As depicted in FIG. 2, an array of black-colored dots 122 is arranged over the white-colored central background area 125. The spatial arrangement of black dots defines the identification code. As depicted in FIG. 2, each black dot fills a cell of a 4×4 array. The presence of a black dot within a cell of the 4×4 array indicates a digital "one". The lack of presence of a black dot within a cell of the 4×4 array indicates a digital "zero". Thus, the 4×4 array is able to convey an arbitrary 16 bit binary number depending on the arrangement of black dots within the array. In one example, the least significant bit is the top, left corner of the array, with increasing significance from left to right, then top to bottom, to arrive at the most significant bit at the bottom, right corner of the array. Conversion of the 16 bit binary number to a decimal (base-10) number is achieved by equation (1), $$ID = \sum_{i=1}^{N} S_i * 2^{i-1} \quad (1)$$

where ID is the coded identification number expressed as a base-10 number, i is the position of each bit in order from left to right and from top to bottom, Si is the state of each bit with a zero value corresponding to a white space and a value of one corresponding to a black dot. In this manner, the 16 bit identification code may be employed to express any of $2^{16}$ (65,536) different base-10 numbers.

Figure 3:
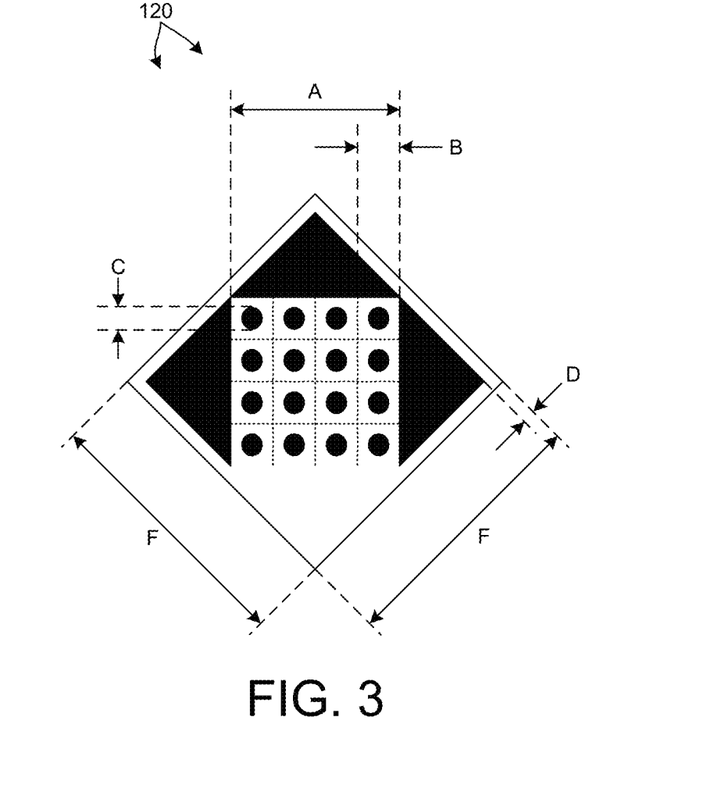
FIG. 3 depicts another illustration of coded identification tag 120 in one embodiment.

FIG. 3 depicts another illustration of coded identification tag 120 in one embodiment. As depicted in FIG. 3, coded identification tag 120 is square shaped having sides of length, F, where F is 45 millimeters. The white-colored central background area 125 has a width, A, where A is 28 millimeters. Thus, each cell of the 4×4 array 122 is square shape having sides of length, B, where B is 7 millimeters. Each black dot with each cell of the 4×4 array is circular in shape and has a diameter of 3.5 millimeters. The white border 123 has a width, D, where D is at least 3 millimeters. The dimensions depicted in FIG. 3 are representative of dimensions useful to accurately decode the coded identification tag from images collected by conventional CCTV equipment at distances greater than one meter and at azimuth and elevation angles up to +/−35 degrees.

Figure 4:
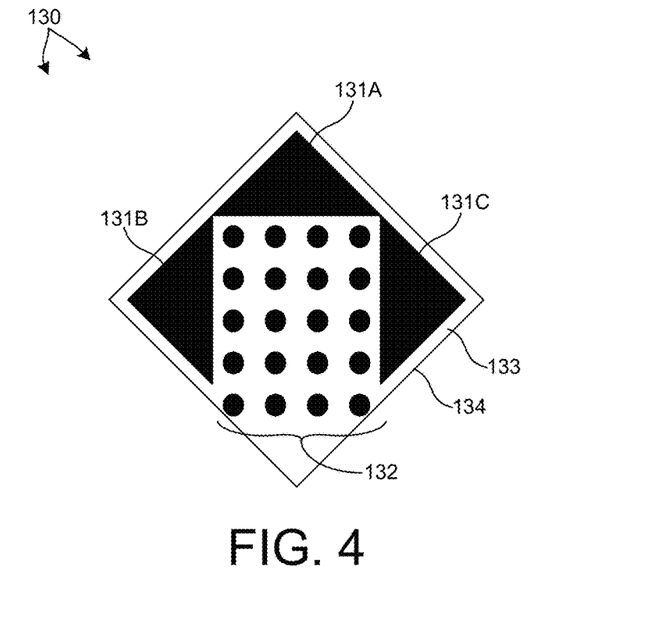
FIG. 4 depicts coded identification tag 130 in another embodiment.

FIG. 4 depicts coded identification tag 130 in another embodiment. The coded identification tag 130 includes three black-colored triangle shapes 131A-C arranged around a white-colored central background area 135 as described with reference to FIG. 2. FIG. 4 also depicts a white colored border 133 at the outer perimeter of coded identification tag 130. The black line 134 illustrates the maximum extent of the coded identification tag 130 in this particular example. As depicted in FIG. 4, an array of black-colored dots 132 is arranged over the white-colored central background area 135. As depicted in FIG. 4, each black dot fills a cell of a 5×4 array. As described with reference to FIG. 2, the presence of a black dot within a cell of the 5×4 array indicates a digital "one". The lack of presence of a black dot within a cell of the 5×4 array indicates a digital "zero". Thus, the 5×4 array is able to convey an arbitrary 20 bit binary number depending on the arrangement of black dots within the array in the manner described with reference to FIG. 2. In this manner, the 20 bit identification code may be employed to express any of 220 (1,048,576) different base-10 numbers.

Figure 5:
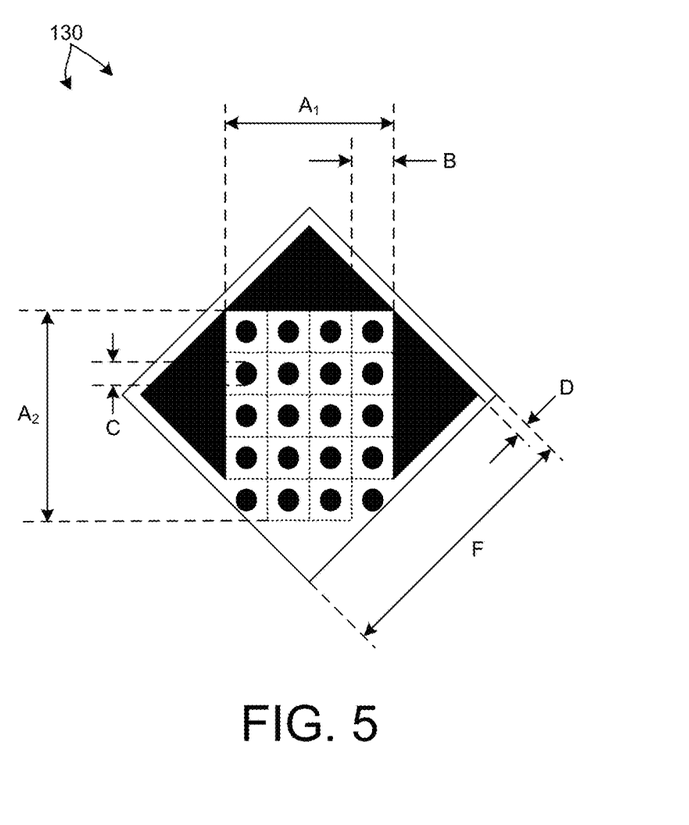
FIG. 5 depicts another illustration of coded identification tag 130 in one embodiment.

FIG. 5 depicts another illustration of coded identification tag 130 in another embodiment. As depicted in FIG. 5, coded identification tag 130 is rectangular shaped having sides of width, F, where F is 45 millimeters. The white-colored central background area 135 has a width, $A_1$, where $A_1$ is 28 millimeters, and a height, $A_2$, where $A_2$ is 35 millimeters. Thus, each cell of the 5×4 array 132 is square shape having sides of length, B, where B is 7 millimeters. Each black dot with each cell of the 5×4 array is circular in shape and has a diameter of 3.5 millimeters. The white border 133 has a width, D, where D is at least 3 millimeters. The dimensions depicted in FIG. 5 are representative of dimensions useful to accurately decode the coded identification tag from images collected by conventional CCTV equipment at distances of at least one meter and at azimuth and elevation angles up to +/−35 degrees.

In general, the dimensions of coded identification tags 120 and 130 may vary from the dimensions described with reference to FIGS. 3 and 5, respectively. In general, the coded identification tag may vary shape and size. In some embodiments, the coded identification tag has a dimension of maximum extent that is less than 150 millimeters. In some embodiments, the coded identification tag has a dimension of maximum extent that is less than 100 millimeters. In some embodiments, the coded identification tag has a dimension of maximum extent that is less than 75 millimeters. In some embodiments, the coded identification tag has a dimension of maximum extent that is less than 50 millimeters. In addition, the shapes of the dots and the triangles may vary. For example, polygons of different sizes and shapes may be employed. In some embodiments, the dots may be shaped as polygons, rather than circular shapes.

As described herein, conventional video imaging equipment employ image sensors having 1-2 megapixel resolution (e.g., 1600×1200 pixel image sensors). In some embodiments, conventional optics are employed to collect images at a range of distances from 1-10 meters. In some other embodiments, conventional optics are employed to collect images at a range of distances from 2-6 meters. FIGS. 8-11 depict different image collection scenarios and the associated imaging requirements to achieve highly accurate identification of the coded number.

Figure 8:
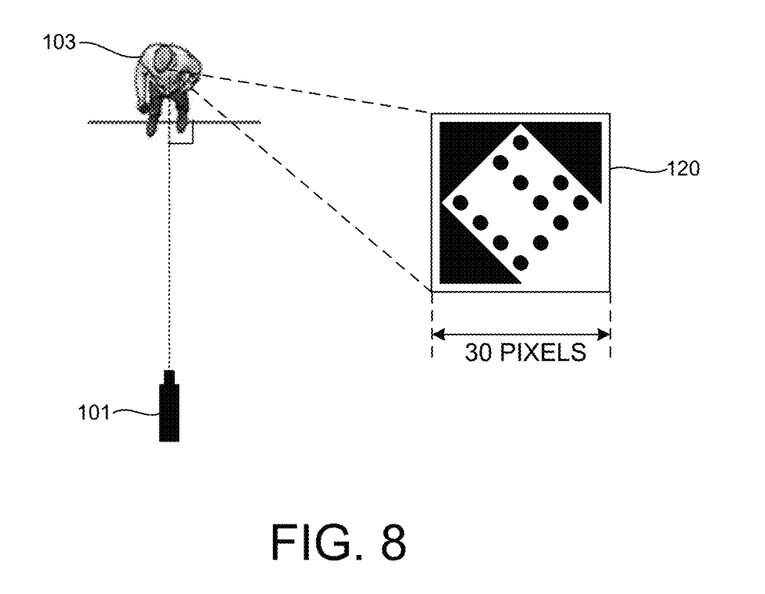
FIG. 8 depicts video imaging device 101 capturing an image of coded identification tag 120 at zero elevation and azimuth angles, and the coded identification tag is oriented in the image at a rotation angle of −45 degrees.

FIG. 8 depicts video imaging device 101 capturing an image of coded identification tag 120 at zero elevation and azimuth angles. In addition, the coded identification tag is oriented in the image at a rotation angle, θ, of −45 degrees. In this example, a suitable video imaging device includes an image sensor resolution and imaging optics that enables the coded identification tag to be imaged at the sensor with at least 30 pixels in the horizontal direction at a distance of at least 2 meters.

Figure 9:
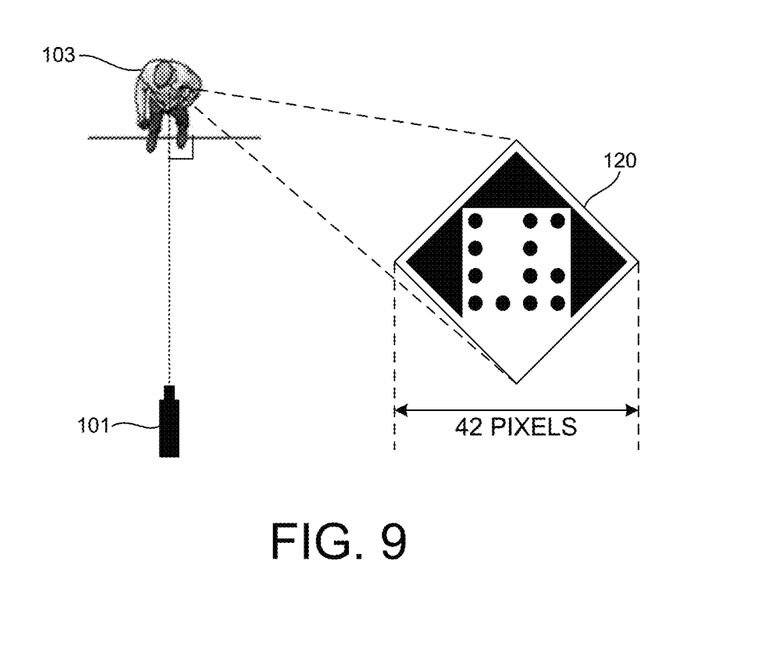
FIG. 9 depicts video imaging device 101 capturing an image of coded identification tag 120 at zero elevation and azimuth angles, and the coded identification tag is oriented in the image at a zero rotation angle.

FIG. 9 depicts video imaging device 101 capturing an image of coded identification tag 120 at zero elevation and azimuth angles. In addition, the coded identification tag is oriented in the image at a zero rotation angle (θ=0 degrees). In this example, a suitable video imaging device includes an image sensor resolution and imaging optics that enables the coded identification tag to be imaged at the sensor with at least 42 pixels in the horizontal direction at a distance of at least 2 meters.

Figure 10:
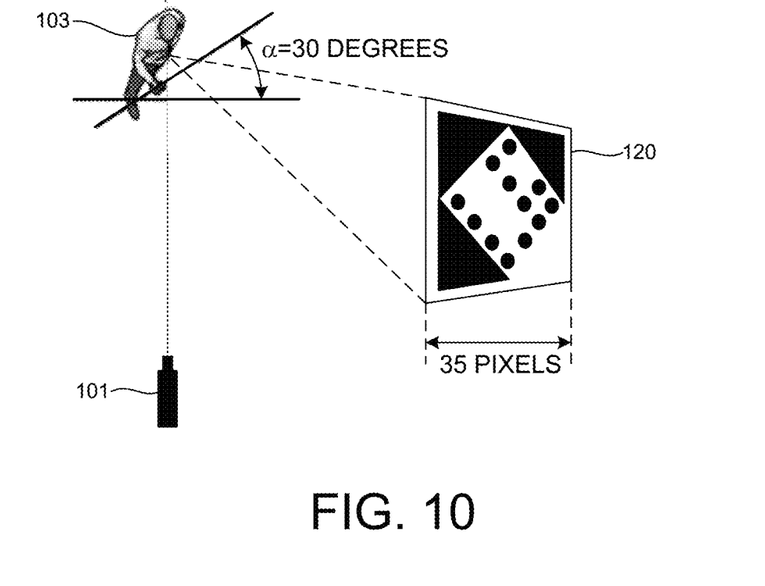
FIG. 10 depicts video imaging device 101 capturing an image of coded identification tag 120 at zero elevation angle and an azimuth angle of 30 degrees. In addition, the coded identification tag is oriented in the image at a rotation angle of −45 degrees.

FIG. 10 depicts video imaging device 101 capturing an image of coded identification tag 120 at zero elevation angle and an azimuth angle, α, of 30 degrees. In addition, the coded identification tag is oriented in the image at a rotation angle, θ, of −45 degrees. In this example, a suitable video imaging device includes an image sensor resolution and imaging optics that enables the coded identification tag to be imaged at the sensor with at least 35 pixels in the horizontal direction at a distance of at least 2 meters.

Figure 11:
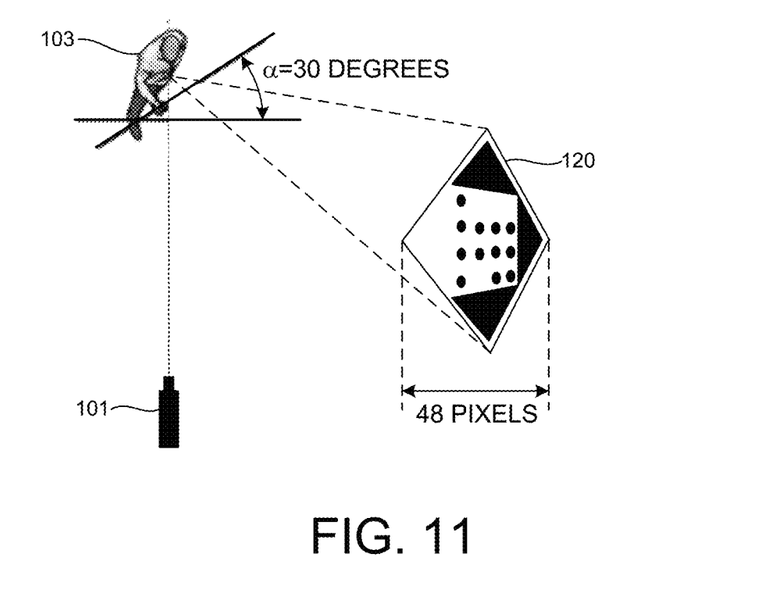
FIG. 11 depicts video imaging device 101 capturing an image of coded identification tag 120 at zero elevation angle and an azimuth angle of 30 degrees. In addition, the coded identification tag is oriented in the image at a zero rotation angle.

FIG. 11 depicts video imaging device 101 capturing an image of coded identification tag 120 at zero elevation angle and an azimuth angle, α, of 30 degrees. In addition, the coded identification tag is oriented in the image at a zero rotation angle (θ=0 degrees). In this example, a suitable video imaging device includes an image sensor resolution and imaging optics that enables the coded identification tag to be imaged at the sensor with at least 48 pixels in the horizontal direction at a distance of at least 2 meters.

Thus, in general the video imaging system 101 is configured to image the coded identification tag 120 in the horizontal direction onto at least 48 pixels of the image sensor at a distance of at least 1 meter to enable accurate reading of the coded identification number as described herein.

In another further aspect, the CITM system determines the coded identification number associated with a coded identification tag from an image when the coded identification tag occupies less than 10% of the area of the image collected by the video imaging system. In some embodiments, the CITM system determines the coded identification number associated with a coded identification tag from an image when the coded identification tag occupies less than 5% of the area of the image collected by the video imaging system. In some embodiments, the CITM system determines the coded identification number associated with a coded identification tag from an image when the coded identification tag occupies less than 3% of the area of the image collected by the video imaging system. In general, CITM system 100 accurately determines the coded number when a single dot of the coded array of dots on the coded identification tag is imaged onto three pixels, two pixels, or even one pixel. Conventional tags require much higher image resolution to determine the code, and thus require that the tag occupy a much higher fill percentage of the collected image.

In a further aspect, a Coded Identification Tag Monitoring (CITM) system captures an image including multiple coded identification tags and determines the coded identification number associated with each of the multiple coded identification tags from the same image. In this manner, multiple coded identification tags may be employed to define a much larger range of base-10 numbers. For example, two 20 bit coded identification tags may be concatenated to represent one 40 bit binary number. This approach enables a coded identification number to be one of over one trillion possible base-10 numbers.

Figure 12:
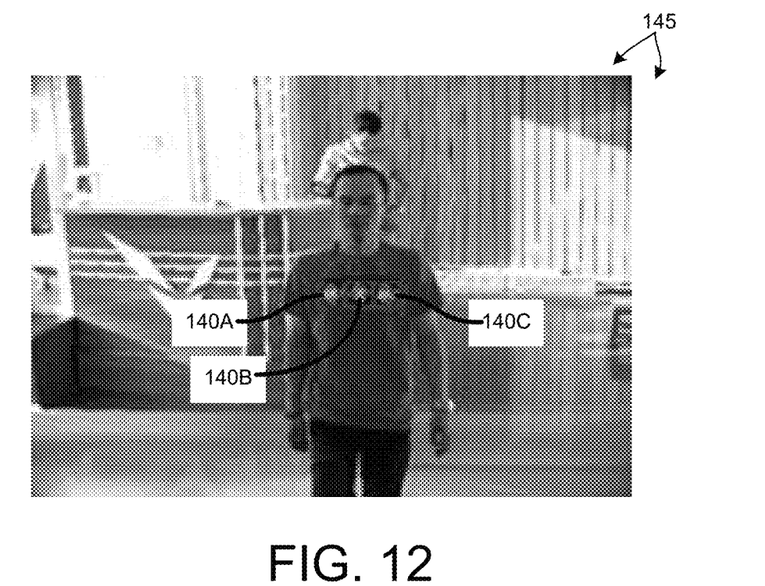
FIG. 12 depicts an overview image including an image of three coded identification tags 140A-C.

FIG. 12 depicts an overview image 145 collected by a video imaging device such as video imaging device 101. As depicted in FIG. 12, the overview image 145 includes an image of coded identification tags 140A-C.

Figure 13A:
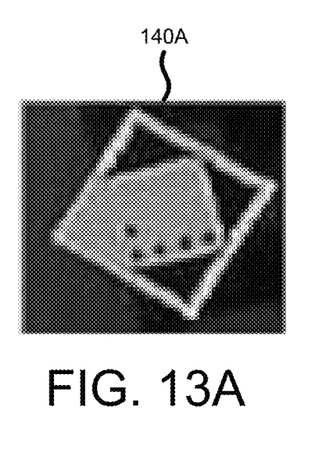
FIG. 13A depicts a portion of the image that includes coded identification tag 140A.

FIG. 13A depicts a portion of image 145 that includes coded identification tag 140A.

Figure 14A:
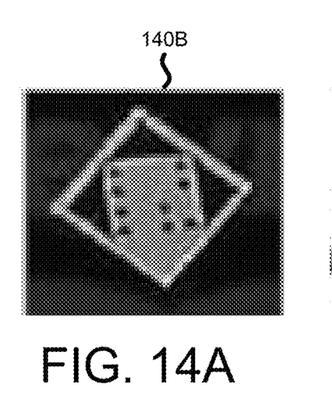
FIG. 14A depicts a portion of the image that includes coded identification tag 140B.

FIG. 14A depicts a portion of image 145 that includes coded identification tag 140B.

Figure 15A:
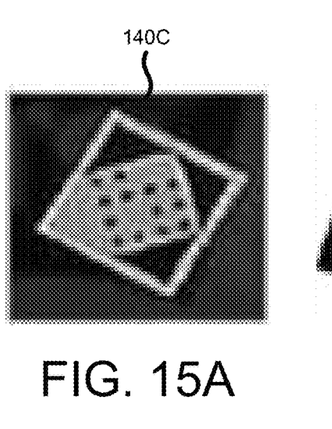
FIG. 15A depicts a portion of the image that includes coded identification tag 140C.

FIG. 15A depicts a portion of image 145 that includes coded identification tag 140C.

Figure 13B:
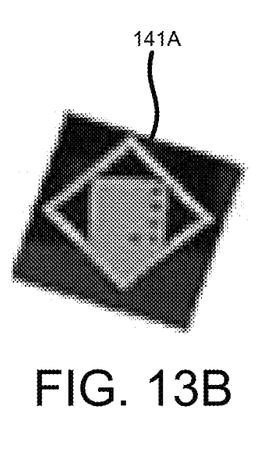
FIG. 13B depicts a rotated image 141A of coded identification tag 140A.

FIG. 13B depicts a rotated image 141A of coded identification tag 140A such that the orientation of the coded identification tag is aligned with the image frame (i.e., the x'y' coordinate frame is aligned with the xy coordinate frame).

Figure 14B:
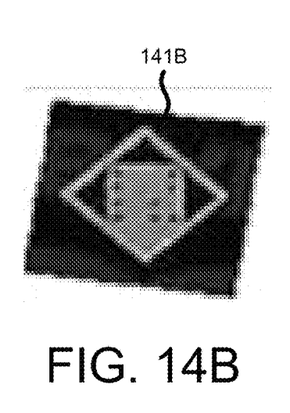
FIG. 14B depicts a rotated image 141B of coded identification tag.

FIG. 14B depicts a rotated image 141B of coded identification tag 140B such that the orientation of the coded identification tag is aligned with the image frame (i.e., the x'y' coordinate frame is aligned with the xy coordinate frame).

Figure 15B:
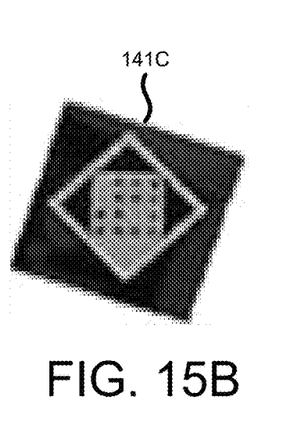
FIG. 15B depicts a rotated image 141C of coded identification tag 140C.

FIG. 15B depicts a rotated image 141C of coded identification tag 140C such that the orientation of the coded identification tag is aligned with the image frame (i.e., the x'y' coordinate frame is aligned with the xy coordinate frame).

FIG. 15A depicts an image 142A of features extracted from the array of dots associated with rotated image 141A.

FIG. 15B depicts an image 142B of features extracted from the array of dots associated with rotated image 141B.

Figure 15C:
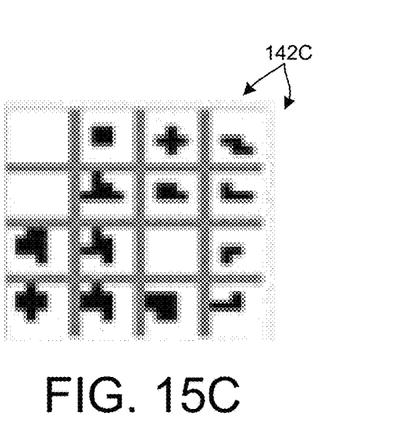
FIG. 15C depicts an image 142C of features extracted from the array of dots associated with rotated image 141C.

FIG. 15C depicts an image 142C of features extracted from the array of dots associated with rotated image 141C.

Figure 13C:
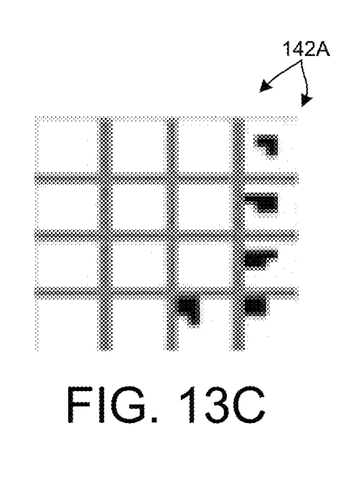
FIG. 13C depicts an image 142A of features extracted from the array of dots associated with rotated image 141A.
Figure 14C:
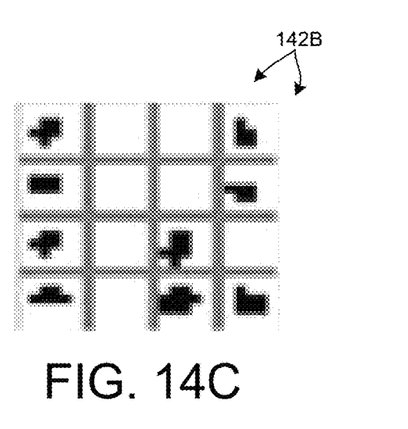
FIG. 14C depicts an image 142B of features extracted from the array of dots associated with rotated image 141B.

The images 142A-C provide a simple representation of the coded identification number. The presence of one or more dark pixels within a cell indicates a '1' value associated with the cell. The absence of one or more dark pixels within a cell indicates a '0' value associated with the cell. The selected filter associated with the determined type of coded identification tag is applied to the area occupied by the array of dots. Within each cell of the array, a determination is made whether there is a dot present.

Figure 16:
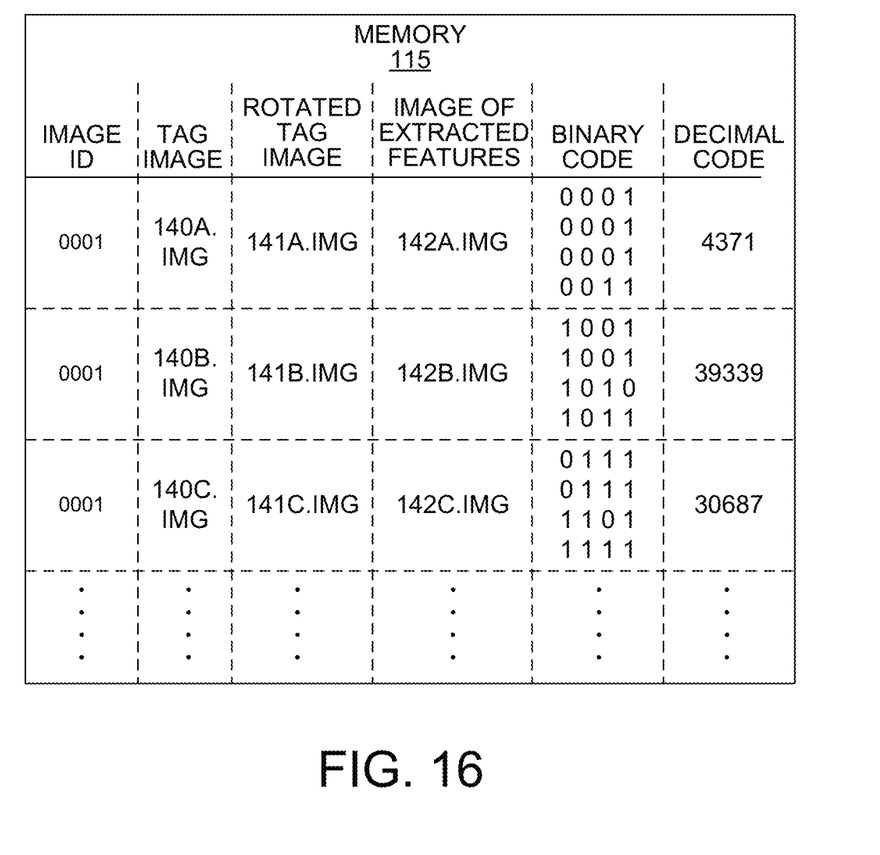
FIG. 16 depicts an illustration of memory 115 of CITM computing system 110 in one embodiment.

FIG. 16 depicts an illustration of memory 115 of CITM computing system 110 including an identification number associated with a particular overview image (e.g., image 145), a tag image associated with each portion of the overview image that includes a different coded identification tag (e.g., images 140A-C), a rotated image associated with each tag image (e.g., images 141A-C), an image of features extracted from each of the rotated images (e.g., images 142A-C), the binary number read from each of the images of extracted features, and an equivalent base-10 number associated with each binary number.

In examples typical of those depicted in FIGS. 12, 13A-C, 14A-C, and 15A-C, Coded Identification Tag Monitoring (CITM) system 100 was able to successfully capture an image of a coded identification tag at a rate of 99.59%. Furthermore, the CITM system 100 was able to accurately read the coded identification number from successfully captured images with at a rate of 99.9873%.

Figure 17:
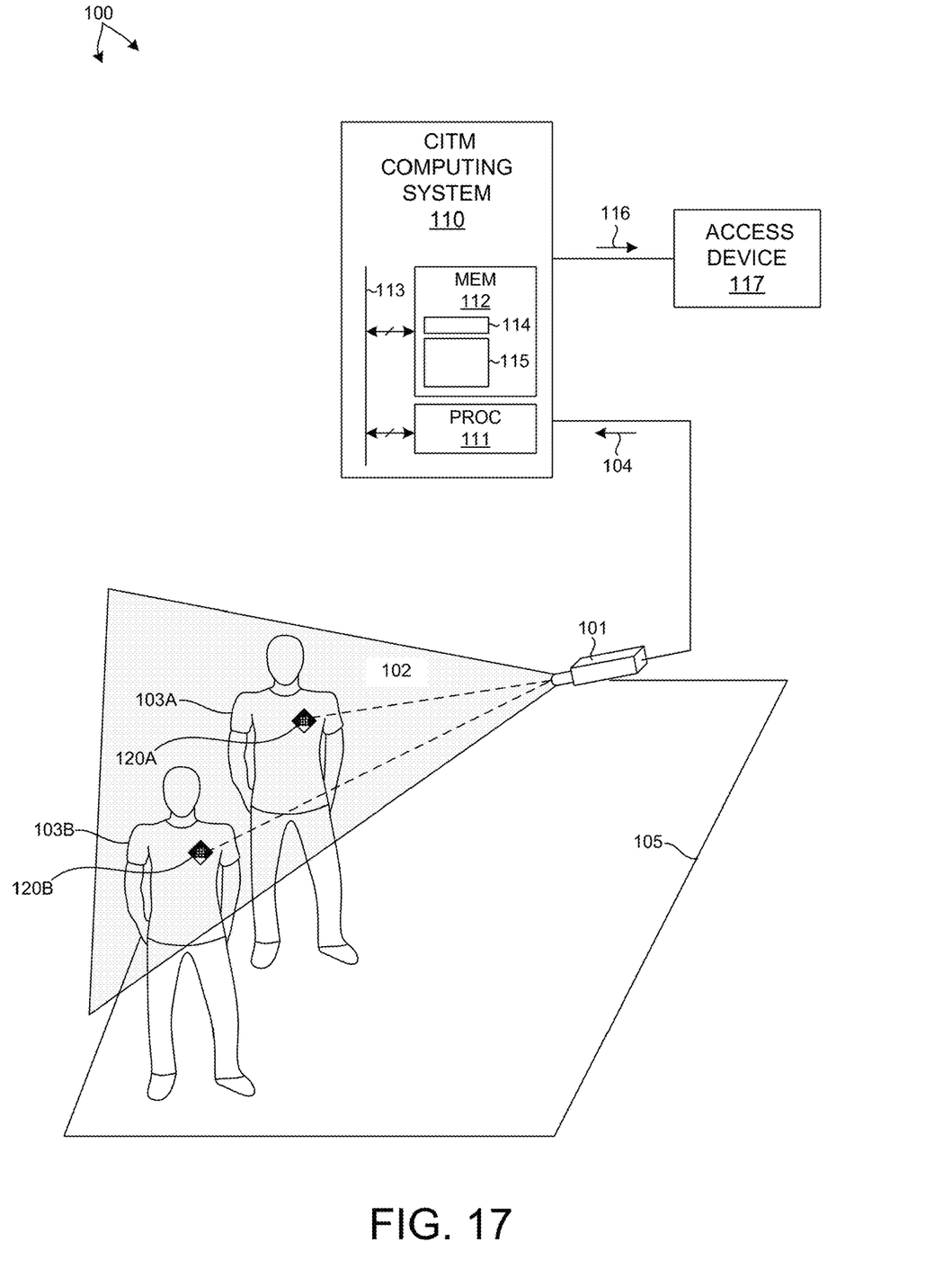
FIG. 17 is a diagram illustrative of Coded Identification Tag Monitoring (CITM) system 100 in another operational aspect.

FIG. 17 is a diagram illustrative of Coded Identification Tag Monitoring (CITM) system 100 as described with reference to FIG. 1. FIG. 17 depicts two humans 103A and 103B, each wearing a coded identification tag 120A and 120B, respectively, in the field of view 102 of video imaging device 101. In this manner, video imaging device 101 captures one or more images of coded identification tags 120A and 120B useful to decode the coded identification tag without close proximity (e.g., less than 10 centimeters) between the video imaging device 101 and the coded identification tags 120A and 120B.

In principle, video imagery collected by a CCTV system may be used to identify a person, for example, by facial recognition. However, significant computational effort is required to identify a person by facial recognition with reasonably high accuracy. In general, facial recognition involves the extraction of facial features from the collected images and comparing those features with corresponding features from a gallery of images of different people. A person is identified when a sufficient match exists between the features extracted from the image of the unidentified person and the features extracted from an image of a particular person in the gallery of images of different people. Identification based on comparison between a collected image and a gallery of images becomes more computationally expensive as the size of the gallery increases. Furthermore, the accuracy of identification of a person by facial recognition is also limited by the available feature extraction techniques, image resolution, etc.

In a further aspect, a CITM system is employed in conjunction with a facial recognition system to accurately identify a person from the same sequence of images. Each of the sequence of images includes both the face of a person and a coded identification tag worn by the person. A coded identification tag worn by an unidentified person is imaged by a video imaging device and the coded identification tag is read by a CITM system as described herein. The decoded identification number is associated with a reference image of a particular person stored in the memory of the CITM system. A facial recognition system is employed to compare the facial features of the face of the unidentified captured by the video imaging device and the facial features of the particular person characterized by the reference image. If the difference between the compared features is below a predetermined threshold, the previously unidentified person is identified as the person associated with the reference image.

In this manner a person is accurately identified using both facial features and a coded identification tag derived from the same collected image. Furthermore, the computational effort associated with the facial recognition process is greatly reduced by using one image to one image comparison to arrive at a face identification, rather than one image to many images.

CITM computing system 110 includes a processor 111 and a memory 112. Processor 111 and memory 112 may communicate over bus 113. In one example, memory 112 includes an amount of memory 115 that stores a number of image records associated with one or more images collected by video imaging device 101. Memory 112 also includes an amount of program instructions 114 that, when executed by processor 111, causes CITM computing system 110 to implement CITM functionality as described herein.

Program instructions 114 implementing methods such as those described herein may be transmitted over a transmission medium such as a wire, cable, or wireless transmission link. For example, as illustrated in FIG. 1, program instructions 114 stored in memory 112 are transmitted to processor 111 over bus 113. Program instructions 114 are stored in a computer readable medium (e.g., memory 112). Exemplary computer-readable media include read-only memory, a random access memory, a magnetic or optical disk, or a magnetic tape.

Computing system 110 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

As depicted in FIG. 1, a video imaging device 101 is communicatively linked to CITM computing system 110 via a communications link. The communications link may be any suitable communication link known to those skilled in the art. For example, video imaging device 101 may be communicatively linked to CITM computing system 110 over a wired network, a local area network (LAN), a wireless communications network, or any other suitable communications network. In one example, video imaging device 101 may be communicatively linked to CITM computing system 110 via a wireless communication link adhering to the IEEE 802.11 protocol, Bluetooth protocol, or any other suitable wireless protocol.

Figure 18:
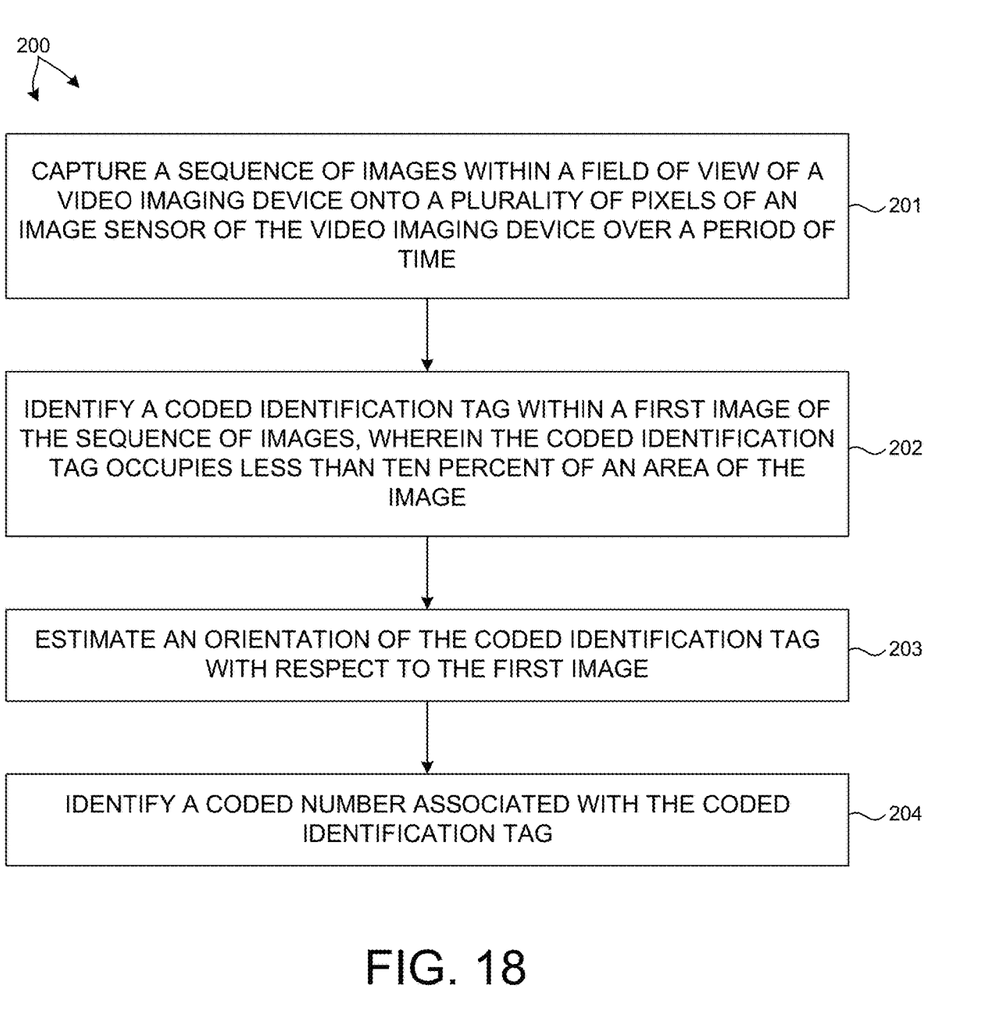
FIG. 18 is a flowchart illustrative of a method 200 for identifying a coded identification tag imaged by conventional CCTV video monitoring equipment.

FIG. 18 illustrates a method 200 for identifying a coded identification tag imaged by conventional CCTV video monitoring equipment. Method 200 is suitable for implementation by a CITM system such as CITM system 100 illustrated in FIGS. 1 and 17 of the present invention. In one aspect, it is recognized that data processing blocks of method 200 may be carried out via a pre-programmed algorithm executed by one or more processors of CITM system 100, or any other general purpose computing system. It is recognized herein that the particular structural aspects of CITM system 100 do not represent limitations and should be interpreted as illustrative only.

In block 201, a sequence of images within a field of view of a video imaging device is captured onto a plurality of pixels of an image sensor of the video imaging device over a period of time.

In block 202, a coded identification tag within a first image of the sequence of images is identified. The coded identification tag occupies less than ten percent of an area of the image.

In block 203, an orientation of the coded identification tag with respect to the first image is estimated.

In block 204, a coded number associated with the coded identification tag is identified.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A Coded Identification Tag Monitoring (CITM) system comprising:
 a video imaging device comprising:
  an image sensor including a plurality of pixels, the image sensor generating electrical signals associated with a sequence of images, each image indicative of an amount of light incident on the plurality of pixels;
  imaging optics that image light over a field of view of the video imaging device onto the image sensor; and a computing system configured to:
receive the electrical signals from the video imaging device associated with the sequence of images; and
identify a coded identification tag within a first image of the sequence of images, wherein the coded identification tag occupies less than ten percent of an area of the image;
estimate an orientation of the coded identification tag with respect to the first image;
identify a coded number associated with the coded identification tag;
identify a portion of a second image of the sequence of images including a face of a person wearing the coded identification tag, wherein the second image includes both the face of the person and the coded identification tag;
identify a plurality of facial features from the portion of the second image including the face;
receive a reference image including a face of a person associated with the coded number;
determine a difference between the plurality of facial features associated with the person wearing the coded identification tag and a plurality of facial features extracted from the reference image; and
identify a match between the person wearing the coded identification tag and the person associated with the coded number if the difference is less than a predetermined threshold value.

2. The CITM system of claim 1, the coded identification tag comprising:
a plurality of dark-colored polygons arranged around a light-colored central background area, wherein the plurality of dark-colored polygons are symmetric about a symmetry axis passing through a geometric center of the coded identification tag, and wherein the plurality of dark-colored polygons are not symmetric about an asymmetry axis passing through the geometric center of the coded identification tag and perpendicular to the symmetry axis;
an array of dark-colored dots arranged over the light-colored central background area; and
a light-colored border around the plurality of dark-colored polygons that extends to the outer perimeter of the coded identification tag.

3. The CITM system of claim 2, wherein the estimating of the orientation of the coded identification tag with respect to the image is based on an orientation of the plurality of dark-colored polygons with respect to the first image.

4. The CITM system of claim 1, wherein a distance between the video imaging device and the coded identification tag is at least one meter.

5. The CITM system of claim 1, wherein an orientation of the video imaging device with respect to a surface of the coded identification tag is characterized by an elevation angle and an azimuth angle, wherein the elevation angle is at least 15 degrees from normal to the surface of the coded identification tag, and wherein the azimuth angle is at least 15 degrees from normal to the surface of the identification tag.

6. The CITM system of claim 1, wherein the coded number is a binary number having at least 16 bits.

7. The CITM system of claim 1, the computing system further configured to:
communicate a command signal to an access device indicating that the person wearing the coded identification tag is granted access to a restricted area controlled by the access device if the difference is less than the predetermined threshold value.

8. The CITM system of claim 1, wherein the first image and the second image are the same image.

9. A method comprising:
capturing a sequence of images within a field of view of a video imaging device onto a plurality of pixels of an image sensor of the video imaging device over a period of time;
identifying a coded identification tag within a first image of the sequence of images, wherein the coded identification tag occupies less than ten percent of an area of the image;
estimating an orientation of the coded identification tag with respect to the first image;
identifying a coded number associated with the coded identification tag;
identifying a portion of a second image of the sequence of images including a face of a person wearing the coded identification tag;
identifying a plurality of facial features from the portion of the second image including the face;
receiving a reference image including a face of a person associated with the coded number;
determining a difference between the plurality of facial features associated with the person wearing the coded identification tag and a plurality of facial features extracted from the reference image; and
identifying a match between the person wearing the coded identification tag and the person associated with the coded number if the difference is less than a predetermined threshold value.

10. The method of claim 9, the coded identification tag comprising:
a plurality of dark-colored polygons arranged around a light-colored central background area, wherein the plurality of dark-colored polygons are symmetric about a symmetry axis passing through a geometric center of the coded identification tag, and wherein the plurality of dark-colored polygons are not symmetric about an asymmetry axis passing through the geometric center of the coded identification tag and perpendicular to the symmetry axis;
an array of dark-colored dots arranged over the light-colored central background area; and
a light-colored border around the plurality of dark-colored polygons that extends to the outer perimeter of the coded identification tag.

11. The method of claim 9, wherein a distance between the video imaging device and the coded identification tag is at least one meter.

12. The method of claim 9, wherein an orientation of the video imaging device with respect to a surface of the coded identification tag is characterized by an elevation angle and an azimuth angle, wherein the elevation angle is at least 15 degrees from normal to the surface of the coded identification tag, and wherein the azimuth angle is at least 15 degrees from normal to the surface of the identification tag.

13. The method of claim 9, wherein the coded number is a binary number having at least 16 bits.

14. The method of claim 9, wherein the first image and the second image are the same image.

* * * * *